United States Patent [19]
DeBruyne et al.

[11] 3,776,067
[45] Dec. 4, 1973

[54] PLANETARY GEAR TRANSMISSION

[75] Inventors: Neil A. DeBruyne, Little Falls; Henry H. Ryffel, Allendale, both of N.J.

[73] Assignee: Curtiss-Wright Corporation, Wood-Ridge, N.J.

[22] Filed: Sept. 19, 1972

[21] Appl. No.: 290,414

[52] U.S. Cl. .................................. 74/801, 184/6.12
[51] Int. Cl. .............................................. F16h 1/36
[58] Field of Search ....................... 74/801; 184/6.12

[56] References Cited
UNITED STATES PATENTS

| | | | |
|---|---|---|---|
| 2,703,021 | 3/1955 | Stoeckicht | 74/801 X |
| 2,802,377 | 8/1957 | Berthiez | 74/801 |
| 3,401,580 | 9/1968 | Sigg | 74/801 |

*Primary Examiner*—Allan D. Herrmann
*Attorney*—Arthur Frederick et al.

[57] ABSTRACT

The planetary gear-speed reduction transmission comprises a housing and a planetary gear train in the housing interconnecting an input shaft and an output shaft. The sun gears and ring gears are of cantilever construction so that the teeth of the sun and ring gears can deflect in response to the twisting of the planetary gears and their carrier under torsional loads and thereby maintain substantial line contact between the meshing teeth and prevent load concentration on one or more gear teeth. All of the gear teeth are so constructed that the clearance space between adjacent gear teeth roots is deeper and wider than in conventional gear teeth construction so that the gear teeth have increased resiliency. To provide further flexibility in the assembly, the ring gear may be connected to the housing in such a manner that it is held against axial movement but allowed limited radial movement relative to the housing. Also, a lubricant cooling means, cooperating with gear teeth formed with the relatively large clearance spaces between the adjacent root portions of the teeth, is provided which permits the gears to operate at very high angular velocities.

17 Claims, 8 Drawing Figures

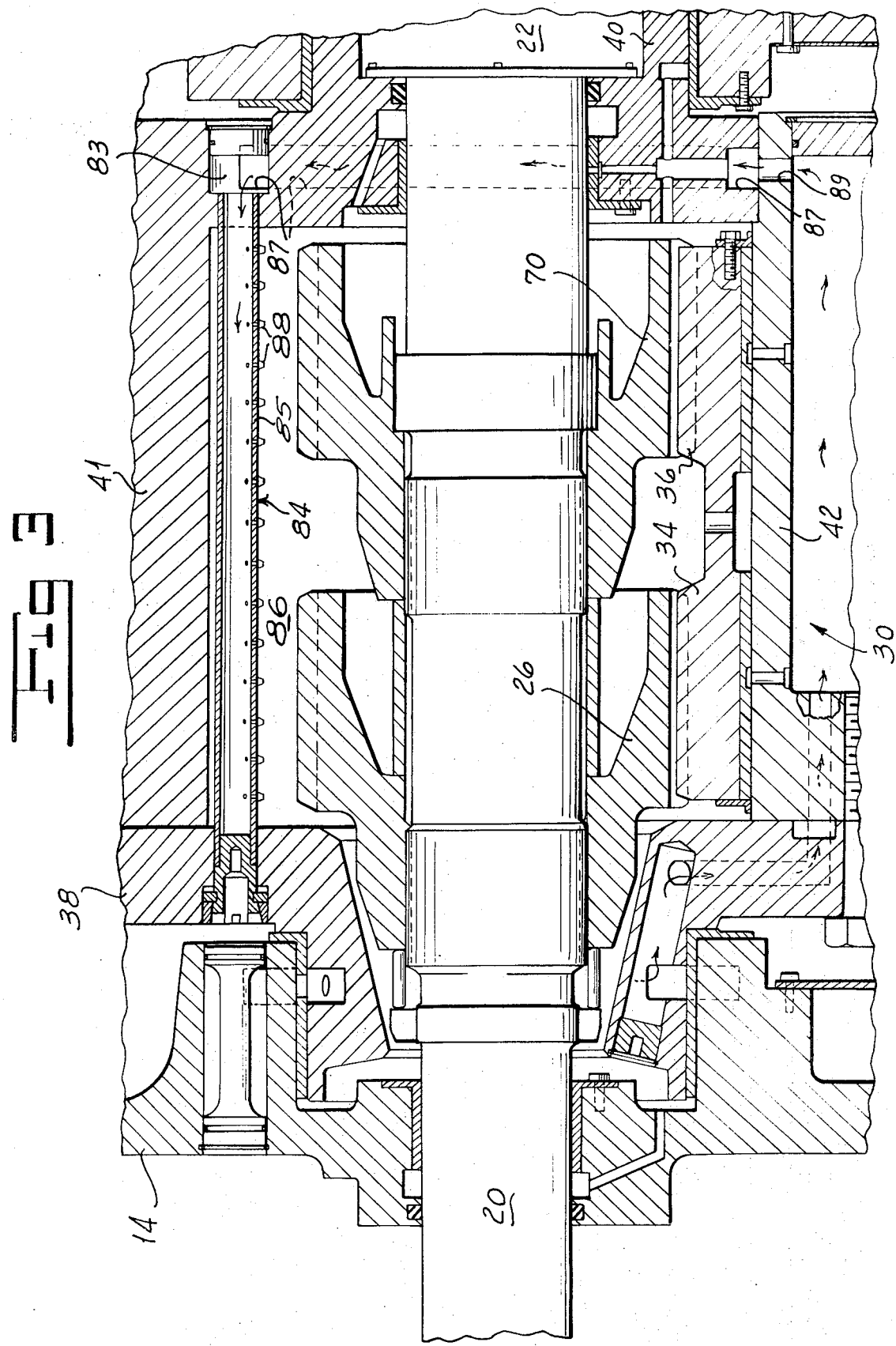

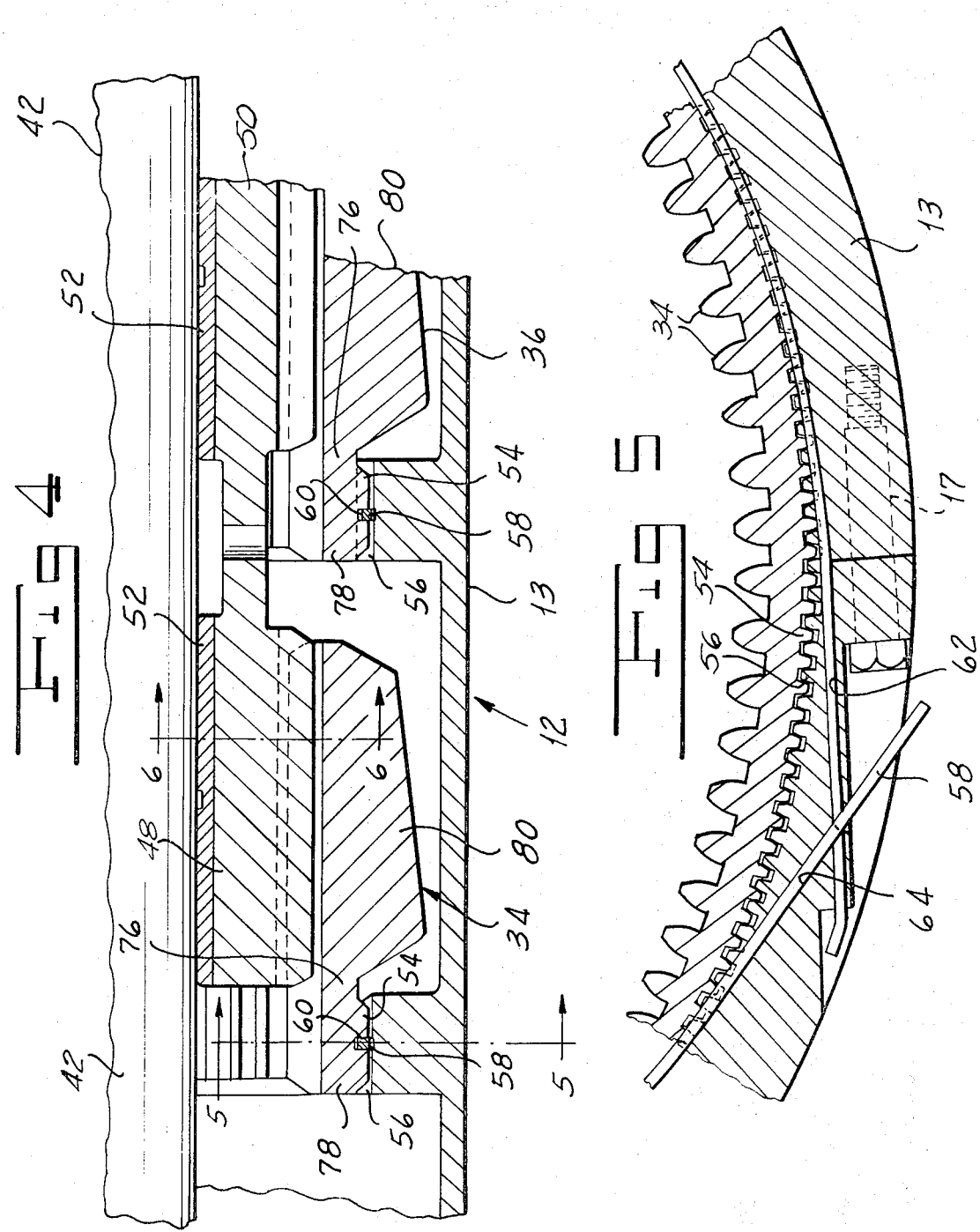

PLANETARY GEAR TRANSMISSION

This invention relates to planetary transmissions and, more particularly, to planetary speed reduction transmissions capable of transmitting very high torque loads.

BACKGROUND OF THE PRESENT INVENTION

Heretofore, in marine propulsion systems speed reduction has been achieved through dual-torque path gear reducer systems having large "bull" gears which alone can have a diameter of 14 feet for a 40,000 to 60,000 horsepower propulsion system operating at 100 rpm propeller speed. These gear reducer systems are exceedingly bulky and heavy and for a gas turbine prime mover operating at about 3,600 rpm to effect a propeller speed of about 100 rpm (a speed reduction ratio of 34 : 1) the conventional gear reducer systems are particularly large and heavy. It is, therefore, desirable to effect a speed reduction through a planetary speed reduction transmission such as disclosed in the U.S. Pat. No. 3,646,834 to Davis.

One of the basic problems to be overcome in providing a commercially acceptable, relatively small, light weight planetary gear reduction transmission of high torque load capacity is the prevention of load concentrations on the components of the transmission, which concentrations result in premature failures and inoperativeness of the transmission. Another problem is one of properly lubricating and cooling a speed reduction transmission which is to effect a speed reduction from about 3,600 rpm to about 100 rpm.

It is, therefore, an object of this invention to provide a planetary gear-speed reduction transmission of relatively small size yet capable of high torque load transmission.

Another object of this invention is to provide a planetary gear-speed reduction transmission in which undesirable load concentration between mating gear teeth is negated.

A further object of the present invention is to provide a planetary gear-speed reduction transmission in which the components automatically adjust to the torsional load imposed on the input and output planetary gear carriers and the separating and thrust loads resulting from the torsional loading.

A still further object of this invention is to provide a planetary gear-speed reduction transmission of high torque capacity and speed reduction ratio which is capable of being properly lubricated and cooled to achieve a relatively long operative life.

A feature of this invention is the tooth construction of the sun, planetary and ring gears, which construction permits the teeth to deflect an amount necessary to provide meshing engagement between the mating gear teeth along their entire lengths as the torsional loading on the transmission changes.

Another feature of the present invention is the cantilever mounting of the ring gears so that the ring gears will deflect radially outwardly to maintain its gear teeth in mesh throughout their lengths with the teeth of the meshing planetary gears, thereby avoiding load concentrations on individual gear teeth.

SUMMARY OF INVENTION

Accordingly, the present invention contemplates a planetary gear-speed reduction transmission of high torque transmitting capacity, and high speed reduction ratio, e.g., about 60,000 horsepower and about 34 : 1 speed reduction ratio, which comprises a housing supporting for rotation therein an input shaft and an output shaft interconnected through a planetary gear train assembly. The planetary gear train assembly comprises a sun gear means which is connected to the input shaft for conjoined rotation with the latter and in meshing relationship with a plurality of circumferentially spaced planetary gear means supported by a cage or carrier, the carrier being connected to the output shaft to rotate the latter. An internal ring gear means, which is part of the planetary gear train assembly, is secured within the housing in meshing relationship with the planetary gear means so that the latter planetates about the sun gear means and, hence, effects rotation of its carrier and the output shaft.

To minimize the thrust forces acting upon the transmission assembly, the sun gear means, planetary gear means and internal ring gear means are constructed so as to form two helical gear train sections in which the helical gear teeth of one section have a helix lead opposite the helix of the helical gear teeth of the other section. Thus, the axially directed thrust force component of the torque force of one helical gear train section is directed opposite the thrust force component of the other to thereby counteract each other.

To provide the assembly with flexibility to automatically compensate for the twisting of the carrier under the torsional loads to which it is subjected and to thereby prevent load concentrations on the mating gear teeth of the transmission assembly, the sun gear means and the ring gear means are of cantilever construction so that the teeth of the sun and ring gear means deflect the amount necessary to match the torsional displacement of the teeth of the planetary gear means and thereby maintain full line contact between the mating teeth and avoid load concentrations on the mating teeth.

For additional flexibility and self-adjusting capabilities the gear teeth of the transmission assembly are provided with deep and wide gaps between the roots of adjacent teeth so that each tooth in the root area is narrower than in conventionally formed gear teeth and, therefore, is capable of flexure as well as providing additional cooling surface and a lubricant escape passage between the high speed meshing teeth.

For still more flexibility, the transmission assembly may be provided in accordance with this invention, with novel means for connecting the ring gear means to the housing which means secures the ring gear from movement axiallly relative to the housing but allows limited radial movement relative to the housing.

A further aspect of this invention contemplates lubricating means which effects efficient cooling as well as lubricating. The lubricating means includes injecting means so disposed relative to the point of mesh between the sun gear means and planetary gear means that lubricating fluid is directed toward one set of meshing teeth as the teeth move out of meshing relationship and toward another set of meshing teeth as they rotate into meshing relationship. Thus, the injection means provides lubrication for meshing engagement of the teeth and the application of lubricant after meshing to cool the teeth.

All of the features of the planetary reduction transmission according to this invention, coact with each other to produce a transmission assembly of relatively small size and light weight in proportion to its torque load transmission capacity by having sufficient flexibility to automatically self-adjust to the twisting of the assembly under torsional loading to which it is subjected and the resultant misalignment of the meshing gear teeth and thereby obviate the possibility of load concentrations on the gear teeth. Also, the novel lubricating means provides the necessary cooling to permit the transmission assembly to operate at very high angular velocities and effect a speed reduction of about 34 : 1 (e.g., from about 3,600 rpm to about 100 rpm).

BRIEF DESCRIPTION OF THE DRAWINGS

The invention will be more fully understood from the following detailed description thereof when considered in connection with the accompanying drawings wherein two embodiments of the invention are illustrated by way of example, and in which:

FIG. 3 is a fragmentary view in cross section taken substantially along line 3—3 of FIG. 1, somewhat enlarged;

FIG. 4 is an enlarged fragmentary, cross-sectional view showing the ring gears and the means for connecting the ring gears to the housing:

FIG. 5 is a cross-sectional view taken substantially along line 5—5 of FIG. 4;

DESCRIPTION OF THE PREFERRED EMBODIMENTS

Figure 1:
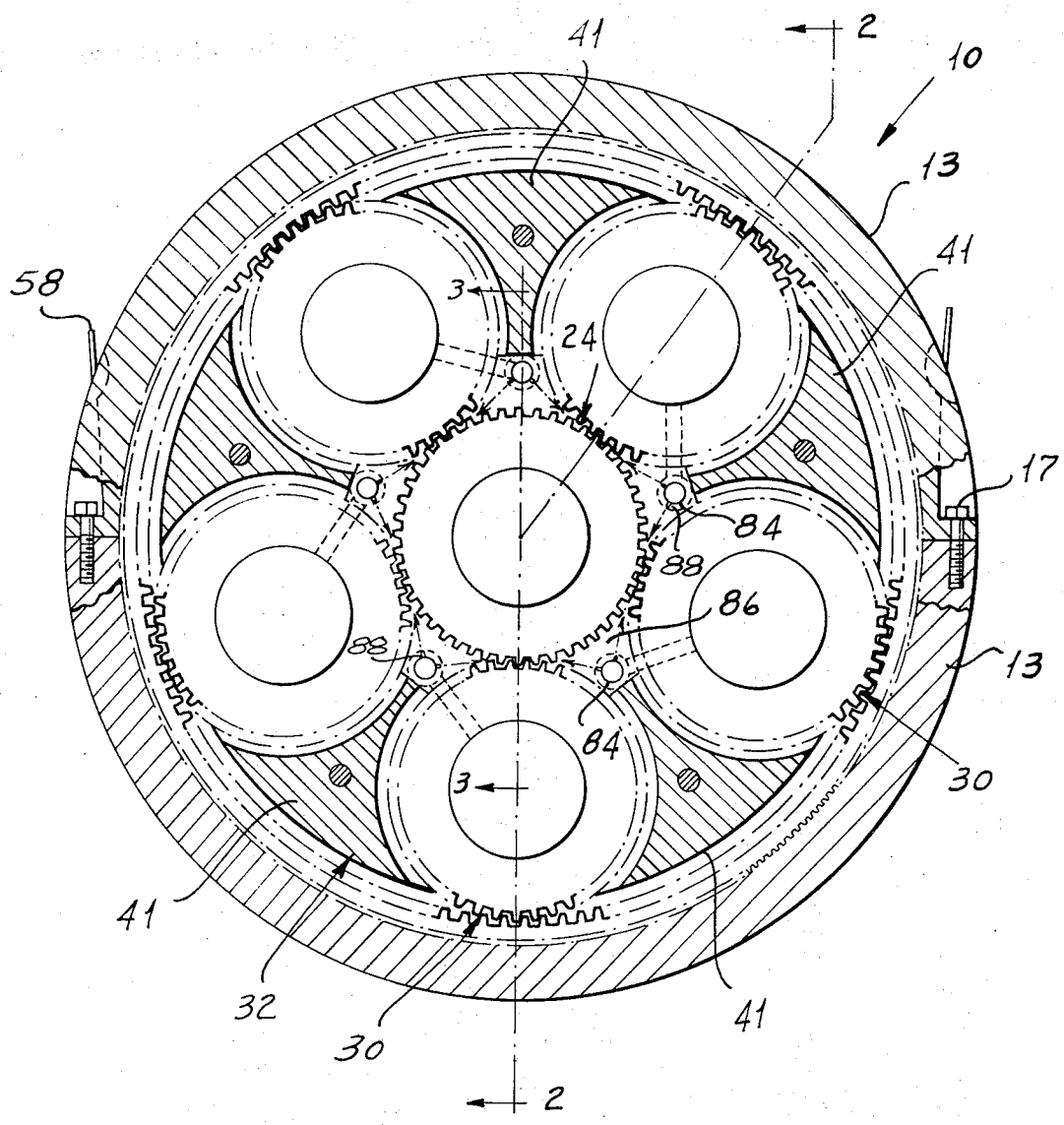
FIG. 1 is a transverse cross-sectional view of the planetary gear, speed reducing transmission according to this invention taken substantially along line 1—1 of FIG. 2.

Now, referring to the drawings and more specifically to FIGS. 1 and 2, the reference numeral 10 generally designates the planetary gear-speed reducing transmission (hereinafter referred to as the "transmission assembly"), according to the present invention. While the transmisssion assembly 10 will be described as functioning as a speed reducer, the invention is not to be limited to such application. Obviously, transmission assembly can function to increase speed merely by driving the unit from the opposite end.

The transmission assembly 10 comprises a housing 12, having a cylindrical wall 13 and opposite end walls 14 and 16, and within which housing a planetary gear train 18 is supported for rotation. As shown in FIGS. 1 and 5, cylindrical wall 13 may be made of two semi-circular sections which are secured together by a plurality of longitudinally spaced bolts 17. A drive or input shaft 20 is supported for rotation coaxially of the housing in end wall 14 while a driven or output shaft 22 is supported for rotation in end wall 16.

The planetary gear train 18 comprises a compound sun gear 24 consisting of two gear elements 26 and 28 and a plurality of planetary gear assemblies 30 which are supported in circumferential spaced relationship to each other and in mesh with compound sun gear 24 by a cage or carrier 32. An internal ring gear means consisting of two ring gear elements 34 and 36 are connected to housing 12 and in meshing relationship with planetary gear assemblies 30.

As shown, carrier 32 comprises two spaced plates 38 and 40 which are supported for rotation in housing end walls 14 and 16, respectively, and, in turn support therebetween, a stud or post 42 of each planetary gear assembly 30. The carrier includes webs 43 which axially extend from plate 40 between and parallel to posts 42. Each post 42 is secured, at one end, to plate 38 by a bolt 44 and, at the opposite end supported in a hole 46 in plate 40. As shown, output shaft 22 may be made integral with plate 40.

Each of the planetary gear assemblies 30 comprises, in addition to post 42, a compound gear element having two gear sections 48 and 50, which gear element is supported for rotation on a sleeve bearing 52 mounted on post 42. The planetary gear sections 48 and 50 are in mesh with sun gear elements 26 and 28, respectively, and with ring gear elements 34 and 36, respectively.

Each ring gear 34 and 36 is secured to housing 12 in such a manner as to be fixed against rotation. As best shown in FIGS. 1, 2, 4 and 5, each ring gear 34 and 36 has an annularly arranged spline portion 54 which meshes with internal spline portion 56 formed on housing 12.

To prevent axial movement of the ring gears relative to the housing and to provide for absorption of axial thrust forces by housing 12, as best shown in FIGS. 4 and 5, each ring gear 34 and 36 is secured to the housing by a key 58 disposed in aligned annular grooves 60 formed in the splined portions 54 and 56. The key 58 may be a piano wire which has a square or rectangular shape in cross section and is receivable in aligned annular groove 60 which has a rectangular shape in cross section. As best illustrated in FIG. 5, the key 58 can be inserted in the aligned grooves 60 after transmission assembly 10 is assembled, by passing the key 58 through an aperture 62 in housing wall 13 until it exits through an aperture 64 in the housing wall adjacent aperture 62. The key 58 has, in a radial direction, a dimension which is less than that of the aligned grooves 60 so that, while the key provides for the transmission of thrust forces to the housing 12, it also allows limited relative movement in a radial direction between the ring gears and the housing which further contributes to the flexibility and self adjusting characteristics of transmission assembly 10 as hereinafter more fully described.

The magnitude of the thrust forces to which the transmission assembly is subjected, is minimized by the compound gear construction of sun gear 24 and planetary gear assemblies 30 and the provision of two ring gears so that gear train 18 comprises two parallel gear sets having the helical gear teeth of one set opposite the lead of helix of the other. Also, without departure from the scope and spirit of this invention, the gear train 18 may comprise herringbone gears.

Figure 8:
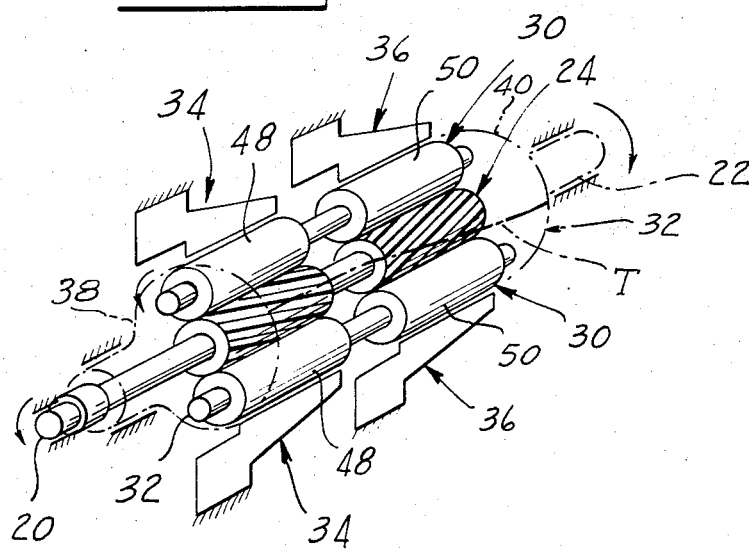
FIG. 8 is a schematic illustration of the planetary gear, speed reducing transmission according to this invention and showing the twisting imposed on the assembly by torsional loading of the assembly.

As illustrated schematically in FIG. 8, the opposite carrier end plates 38 and 40 will twist (angularly rotate) relative to each other when transmission assembly 10 is under load. This twist is represented by the dot-dash line T in FIG. 8. The degree of twist or misalignment is dependent upon the torsional stiffness of carrier 32 which stiffness is a function of the moments of inertia of planetary gears 48 and 50 and posts 42 of carrier 32. To avoid load concentrations as a result of carrier twist on the mating gear teeth between sun gear elements 26 and 28, planetary gear sections 48 and 50 and ring gears 34 and 36, the transmission assembly 10 is so constructed, in accordance with this invention, so that the components of transmission assembly 10 automatically undergo the proper deflections under load to compensate for the carrier twist and thereby maintain between the mating faces of the gear teeth, line contact. This flexibility and the capability of transmission assembly 10 to automatically adjust to the carrier distortion, is achieved by various coacting novel structural features, hereinafter fully explained.

Figure 2:
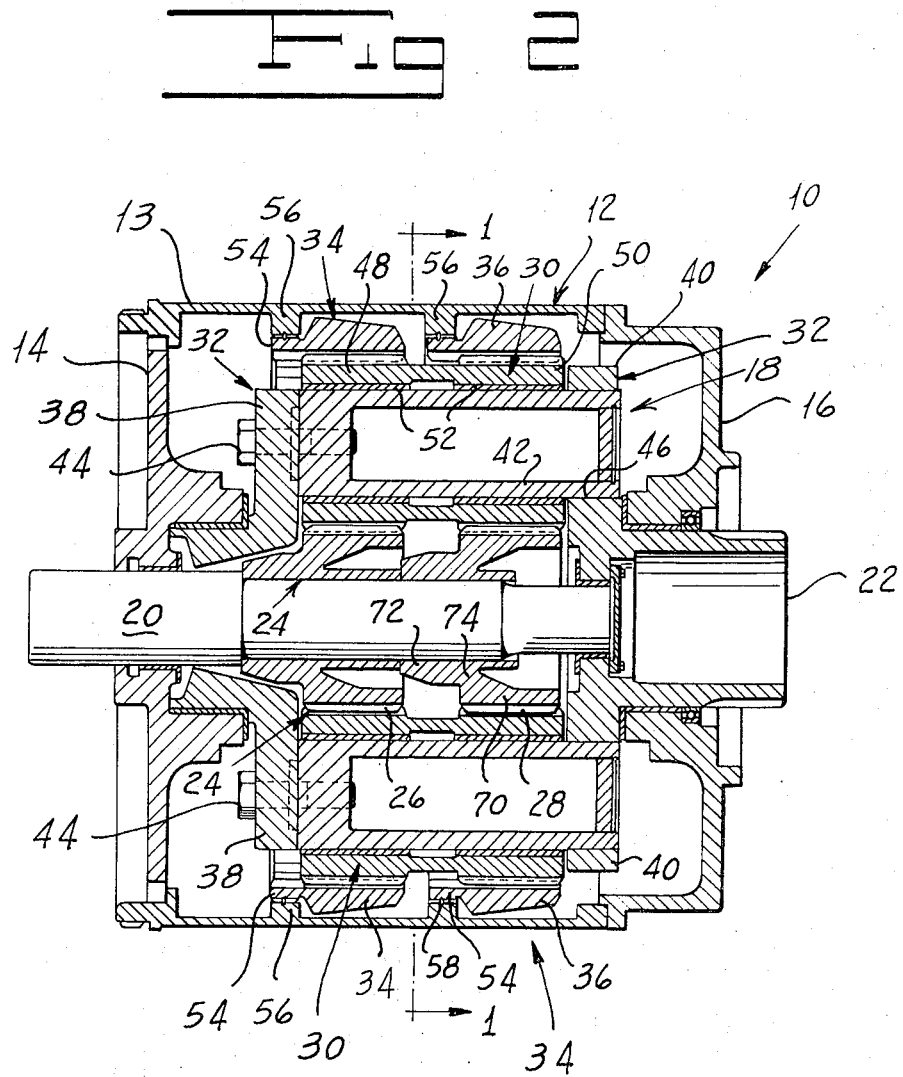
FIG. 2 is a longitudinal view in cross section taken substantially along line 2—2 of FIG. 1 and shown on a slightly smaller scale.

One of these novel structural features is, as best shown in FIG. 2, the cantilever construction of sun gear elements 26 and 28. As shown, the web, rim or crown 70 is axially offset from the hub or boss portion 72 of each sun gear element and attached to the boss portion 72 by a relatively thin and, hence, flexible integral web 74. Thus, sun gear elements 26 and 28 are capable of distortion, flexure or deflection under the forces resulting from the carrier twist, so that the teeth of sun gears 26 and 28 automatically seek to maintain with the mating teeth of planetary gear elements 48 and 50, a line contact along the impinging faces of the mating teeth; this function obviates load concentrations on individual gear teeth which might result in their fracture and eliminates the necessity for limiting the torque transmitting capacity of the transmission assembly.

As best shown in FIG. 4, each of the ring gears 34 and 36, similar to sun gear element 26 and 28, is of cantilever construction which provides a relatively thin, flexible integral web 76 interconnecting a hub portion 78 and an axially offset crown portion 80. In order for each ring gear 34 and 36 to carry the load evenly (uniform load distribution), it must deflect radially outwardly in proportion to the separating and thrust loads, this deflection or distortion being made possible by reason of the flexible web 76. Also, as previously discussed, each ring gear 34 is capable of limited radial movement in addition to deflection, by reason of the splined interconnection between the housing and each of the ring gears.

In furtherance of providing the requisite flexibility for permitting the transmission assembly 10 to automatically self-adjust to the carrier distortion or twist, both ring gears 34 and 36 are located toward the drive shaft side of the carrier 32.

Figure 6:
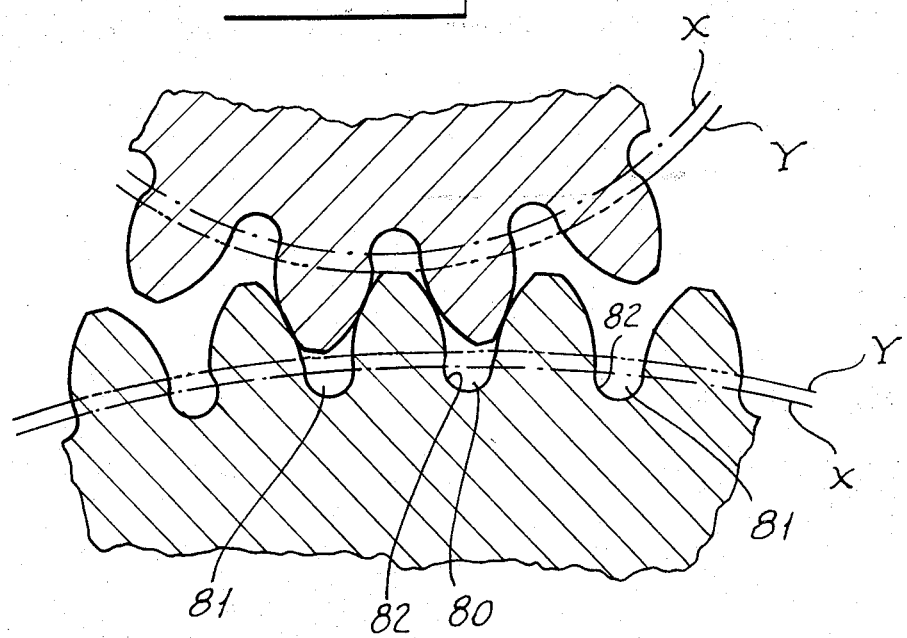
FIG. 6 is a fragmentary view in cross section taken substantially along line 6—6 of FIG. 4, on a substantially enlarged scale.

Additional flexibility and self-adjusting ability is provided transmission assembly 10, by providing sun gear elements 26 and 28, planetary gear sections 48 and 50 and ring gears 34 and 36 with the novel tooth configuration illustrated in FIG. 6. As shown, the gear teeth are so formed that the gap or clearance space 81 between the roots of adjacent teeth extends below the normal dedendum circle, designated by the dot-dash line X, and widens below the working circle, shown by the dash-double-dot line Y, to form a somewhat reverse-fillet 82. This tooth construction provides each tooth with greater inherent flexibility than a conventionally constructed gear tooth and, in addition, improved cooling of the gears as hereinafter more fully explained.

As best shown in FIGS. 1 and 3, lubrication and cooling of transmission assembly 10 is provided for by a plurality of lubricant distributor-injection nozzles 84. There is provided one injection nozzle 84 for each planetary gear assembly 30. Each injection nozzle 84 has an elongated hollow cylindrical wall 85 closed at one end and open at the other end to a chamber 83 to communicate with a source of lubricant under pressure through an annular manifold 87 in wall 40 of carrier 32, the manifold being in turn, in communication with the interior of posts 42 via passageways 89 to receive lubricant from the latter. The injection nozzles 84 are supported at opposite ends by plates 38 and 40 of carrier 32 so as to extend in parallel to the axis of and the full length of each planetary gear assembly 30. As best shown in FIG. 1, each injection nozzle 84 is disposed in the space 86 between the sun gear 24 and the two adjacent planetary gear assemblies 30 which mesh with the sun gear. To provide for directing lubricant at the point of mesh between the sun gear elements 26 and 28 and planetary gear sections 48 and 50 of the two adjacent planetary gear assemblies, two circumferentially spaced rows of longitudinally spaced emission ports 88 are provided in cylindrical wall 85. One row of ports 88 is located so that the ports 88 direct streams of lubricant into the gear teeth travelling into meshing relationship to provide principally for lubrication during meshing. The other row of ports 88 are located so that ports 88 direct streams of lubricant at the gear teeth rotating out of meshing relationship to thereby principally effect a cooling of the gear teeth. As previously discussed, the tooth construction according to this invention as shown in FIG. 6, improves the cooling effectiveness by permitting lubricant to more freely move into and out of contact with the gear teeth through the extra large clearance space 81. In accordance with this invention, the planetary gear train 18 is constantly bathed in lubricant since the injection nozzles 84 are carried by carrier 32 along with the planetary gear assemblies so as to continuously direct lubricant streams at the meshing gear teeth of sun gear 24 and planetary gear assemblies 30. Any suitable passage means (partly shown in FIG. 3) may be employed to conduct pressurized lubricant from a source thereof (not shown) into and through the rotating carrier and posts 42 so that lubricant can be continuously supplied to injector nozzles 84. Likewise, transmission assembly 10 may be provided with any suitable means for collecting and recirculating the lubricant after injection into the assembly. This efficient cooling system enables transmission assembly to operate at high speeds where high temperatures and wear would be expected, and, therefore, can function to effect a speed reduction from about 3,600 rpm to about 100 rpm or at a ratio of about 34 : 1.

Figure 7:
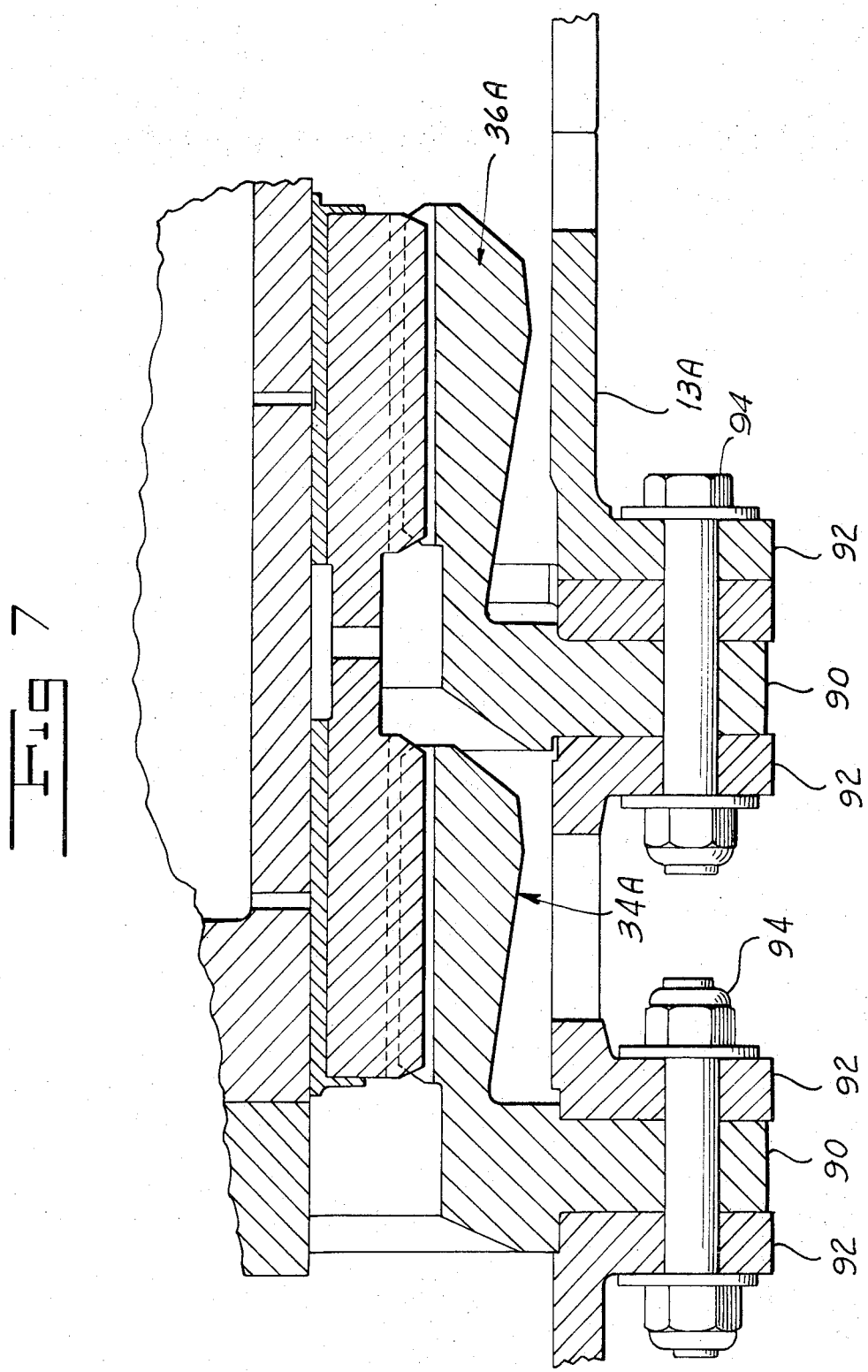
FIG. 7 is a fragmentary view in cross section, similar to FIG. 4, showing an alternative means for connecting the ring gears to the housing.

In FIG. 7 is shown an alternative means for securing ringgears to cylindrical wall 13 of housing 12. Instead of securing the ring gears to housing 12 by the splined connections 54 and 56, each ring gear 34A and 36A is provided with a flange portion 90 which is clamped between radial flanges 92 formed on cylindrical housing wall 13A. A plurality of circumferentially spaced bolts 94 (only one of which is shown for each ring gear) is provided to draw flanges 92 into tight abutment against flange portion 90 of the ring gears. A distinguishing aspect of this alternative embodiment from the embodiment shown in FIGS. 1 to 6, is that the overall diameter of housing 12 is greater and is does not provide the limited radial movement permitted by the splined interconnection 54 and 56 between the housing and ring gears. However, in all other respects this alternative embodiment is structurally and functionally the same as the embodiment shown in FIGS. 1 to 6.

Operation

In operation of transmission assembly 10, assuming no initial misalignment, substantially perfect geometrical machining and assembly of the transmission components, the teeth of planetary gear sections 48 and 50 will be in mesh with and make uniform or line contact along their lengths with the sun gear elements 26 and 28 and ring gears 34 and 36 under loads of very small magnitude. Thus, the loads are uniformly distributed along the gear teeth and failure due to excessive strain on a gear tooth is obviated. As increasing torque is applied to carrier 32, through drive shaft 20, the longitudinal centerlines of the planetary gear assemblies 30 become inclined relative to their initial positions due to the twist or angular displacement between plates 38 and 40 of carrier 32 (see FIG. 8); this twist is represented in FIG. 8 by the line T. The twisting or misalignment created by the increased torque load, will cause the planetary gear sections 48 and 50 to apply a force at only one end of sun gear elements 24 and 26 and ring gears 34 and 36. However, when this non-uniform load is applied, the sun gear teeth and teeth of the ring gears deflect to the extent of the twist or inclination of the planetary gear assemblies so that uniform or line contact along the length of the meshing gear teeth is maintained as the torque load varies. Thus, because of this automatic self-adjusting capability of transmission assembly 10, the transmission assembly in relation to its overall relatively small size has the capacity to transmit high torque loads, e. g., about 60,000 horsepower for an overall size of about 9 feet in diameter and about 10 feet in length.

The transmission of torque is effected by transmission assembly 10 by applying a torque load to drive shaft 20 through a prime mover (not shown), such as a gas turbine, which effects a rotation of sun gear means 24. Rotation of the sun gear means, in turn, rotates planetary gear assemblies 30 which are in mesh with the sun gear means. Since the planetary gear assemblies also mesh with the fixed ring gear means 34 and 36, the reaction causes the planetary gear assemblies to walk around the ring gear means. Further, since planetary gear assemblies 30 are mounted on carrier 32, the carrier 32 is rotated as the planetary gear assemblies planetate (simultaneous rotation about their own axes and about the axis of sun gear means 24). The driven or output shaft 22 being part of the carrier, it is rotated at a reduced speed to drive shaft 20, depending upon the geometry of the assembly, such speed reduction may be at a ratio of about 34 : 1.

It is now believed readily apparent that the present invention provides a planetary gear-speed reduction transmission which is capable of transmitting high torque load and effecting a high reduction in speed; such as about 34 : 1. It is a transmission assembly which automatically self-adjusts to changes in torque loads to thereby maintain a uniform distribution of load forces across the lengths of the meshing gear teeth. It is also a transmission assembly in which sun gear 24 and the drive shaft 20 are free to float radially and axially while the planetary gear sections 48 and 50 are free to float axially to thus also contribute to insuring uniform load distribution within the assembly. It is a transmission assembly which is capable of operating at very high speeds by reason of efficient lubrication and cooling of the assembly.

Although two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A planetary gear transmission assembly comprising a plurality of circumferentially spaced planetary gear assemblies supported by a carrier in mesh with a sun gear means and a fixed internal ring gear means to transmit torque from a drive shaft to an axially aligned driven shaft, the improvement comprising:
   a. sun gear means, including a hub portion and an integral first cantilever gear tooth portion to permit the teeth of said gear tooth portion to deflect under unbalanced loading to maintain substantially continuous line contact with the meshing teeth of said planetary gear assemblies;
   b. ring gear means including a second hub portion and an integral second cantilever gear tooth portion to permit the teeth of said ring gear tooth portion to deflect under unbalanced loading to maintain substantially continuous line contact with the meshing teeth of said planetary gear assemblies; and
   c. each of the gear teeth of said first and second gear tooth portion and the gear teeth of said planetary gear assemblies being provided with a clearance space between the tooth roots which clearance space extends substantially below the working depth circle of the gear teeth and in width so that each tooth root is relatively narrow and thereby have resiliency.

2. The assembly of claim 1 wherein said sun gear means, ring gear means and said planetary gear assemblies each include two gear elements so that the torque is transmitted through two parallel gear trains.

3. The assembly of claim 2 wherein each of said two gear elements consist of helical gear teeth having opposite lead of helix.

4. The assembly of claim 1 wherein a lubricant means is provided for applying lubricant simultaneously to the sun gear means and planetary gear assembly as the teeth of said sun gear means and planetary gear assembly rotate into mesh and as they rotate out of meshing relationship.

5. The assembly of claim 1 wherein a fixed support is provided and wherein said ring gear means is connected to the fixed support.

6. The assembly of claim 5 wherein said ring gear means is spline connected to the fixed support to prevent rotative movement of said ring gear means.

7. The assembly of claim 6 wherein a locking means is provided to prevent relative axial movement between the ring gear means and fixed support.

8. The assembly of claim 5 wherein said fixed support is a cylindrical housing.

9. THe assembly of claim 4 wherein said lubricant means includes a plurality of nozzles each of which is carried by the carrier and has port means for emitting a multiplicity of lubricant streams.

10. A planetary gear-speed reduction transmission assembly comprising a housing, a carrier supported for rotation in said housing, a drive shaft supported in said housing for rotation and connected to rotate a sun gear having two gear elements, a driven shaft connected to the carrier and supported for rotation in the housing, a ring gear means having two fixed internal gears secured to said housing, a plurality of planetary gear assemblies each of which has two gear sections supported by said carrier so that each of the two gear sections mesh with the two sun gear elements and the two ring gears to thereby transmit torque from the drive shaft to said driven shaft via said carrier, the improvement comprising:

a. each of said two gear elements of the sun gear and each of said two ring gears has a hub portion and a toothed portion axially offset from and connected to the hub portion by a cantilever web portion so that the teeth of said sun gear elements and said ring gears are capable of deflection under unevenly exerted loads between the meshing teeth of the planetary gear sections, sun gear elements and the ring gear to thereby maintain substantially continuous line contact between the meshing teeth under varying torque loads, and
  b. each of the gear teeth of the toothed portion of the sun and ring gears and gear teeth of the toothed portion of each of the gear sections of the planetary gear assemblies is provided with a clearance space between the adjacent tooth roots which clearance space extends substantially below the working depth circle of the gear teeth and in width such that the teeth roots are relatively narrow and thereby have flexibility.

11. The apparatus of claim 10 wherein said two fixed ring gears are located substantially on the drive shaft side of the planetary gear section closest to the driven shaft.

12. The apparatus of claim 10 wherein one set of meshing sun, planetary and ring gears has lead helix opposite from the lead helix of the other set of meshing sun, planetary and ring gears.

13. The apparatus of claim 10 wherein each of said ring gears is spline connected to the housing to prevent rotative movement but allow limited radial movement of the ring gears relative to the housing.

14. The apparatus of claim 10 wherein a lubricant means is disposed in said carrier and constructed and arranged to simultaneously lubricate the two sun gear elements and two planetary gear sections as their teeth rotate into and out of mesh.

15. The apparatus of claim 13 wherein locking means is provided to prevent relative axial movement between the ring gear means and said housing.

16. The apparatus of claim 15 wherein said locking means comprises two aligned annular grooves in the spline interconnection between each of the ring gears and the housing and a key is loosely receivable within said aligned annular grooves.

17. The apparatus of claim 14 wherein said lubricant means comprises a plurality of tubular members having a plurality of lubricant emission ports therein.

* * * * *